(12) United States Patent
Huang et al.

(10) Patent No.: US 8,551,926 B2
(45) Date of Patent: Oct. 8, 2013

(54) STABILIZING EMULSIFIED ACIDS FOR CARBONATE ACIDIZING

(71) Applicants: Tianping Huang, Al Khobar (SA); James B. Crews, Willis, TX (US); John R. Willingham, Cypress, TX (US); Richard A. Mitchell, Houston, TX (US); Kushal Seth, Houston, TX (US)

(72) Inventors: Tianping Huang, Al Khobar (SA); James B. Crews, Willis, TX (US); John R. Willingham, Cypress, TX (US); Richard A. Mitchell, Houston, TX (US); Kushal Seth, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 13/781,276

(22) Filed: Feb. 28, 2013

(65) Prior Publication Data

US 2013/0178400 A1    Jul. 11, 2013

Related U.S. Application Data

(62) Division of application No. 12/903,802, filed on Oct. 13, 2010, now Pat. No. 8,403,051.

(51) Int. Cl.
   *C09K 8/14* (2006.01)
   *E21B 43/16* (2006.01)

(52) U.S. Cl.
   USPC .......................................... 507/267; 166/307

(58) Field of Classification Search
   None
   See application file for complete search history.

(56) References Cited

U.S. PATENT DOCUMENTS

| | | | |
|---|---|---|---|
| 3,779,915 A * | 12/1973 | Kucera | 507/219 |
| 3,934,651 A | 1/1976 | Nierode et al. | |
| 4,359,391 A * | 11/1982 | Salathiel et al. | 507/277 |
| 5,294,353 A | 3/1994 | Dill | |
| 5,910,467 A | 6/1999 | Bragg | |
| 6,734,144 B2 | 5/2004 | Varadaraj et al. | |
| 6,805,198 B2 | 10/2004 | Huang et al. | |
| 6,849,581 B1 | 2/2005 | Thompson et al. | |
| 7,033,975 B2 | 4/2006 | Baran et al. | |
| 7,186,673 B2 | 3/2007 | Varadaraj et al. | |
| 7,244,694 B2 * | 7/2007 | Fu et al. | 507/269 |
| 7,727,936 B2 | 6/2010 | Pauls et al. | |
| 2003/0119680 A1 | 6/2003 | Chang et al. | |
| 2008/0179062 A1 * | 7/2008 | Watkins et al. | 166/308.2 |
| 2009/0042749 A1 * | 2/2009 | Meier et al. | 507/209 |
| 2009/0065209 A1 | 3/2009 | Huang et al. | |
| 2009/0111718 A1 | 4/2009 | Gadiyar et al. | |
| 2010/0252266 A1 | 10/2010 | Huang et al. | |
| 2011/0111989 A1 | 5/2011 | Bustos et al. | |

OTHER PUBLICATIONS

Aquet® 942 Acid Emulsifier Material Safety Data Sheet, May 18, 2006, Baker Petro lite Corporation.
Nasr-Ei-Din, Hisham A., et al., "Development and Field Application of a New, Highly Stable Emulsified Acid," SPE 115926, SPE Annual Tech. Conf., Denver, Colorado, Sep. 21-24, 2008.
Al-Mutairi, S.H. et al., "Fracture Conductivity Using Emulsified Acids: Effects of Emulsifier Concentration and Acid Volume Fraction," IPTC 12186, Int'l Petroleum Tech. Conf., Kuala Lumpur, Malaysia, Dec. 3-5, 2008.

* cited by examiner

*Primary Examiner* — James J Seidleck
*Assistant Examiner* — Kumar Bhushan
(74) *Attorney, Agent, or Firm* — Mossman Kumar & Tyler PC

(57) ABSTRACT

Emulsified acids have been used to increase production rates of oil and gas in carbonate reservoirs through acid fracturing and matrix acidizing operations. An emulsifier is used to emulsify the aqueous acid with an oil, usually diesel. Very small particles, such as colloidal clay particles and/or nanoparticles increase the stability of the emulsified acids over an elevated temperature range.

13 Claims, 2 Drawing Sheets

Viscosities of Emulsified Acids at 200°F (93°C) and 100 1/s
Base: 20% HCl + 1% Corrosion Inhibitor + 1% Iron Control Agent + 2.5% Surfactant + 30% Diesel

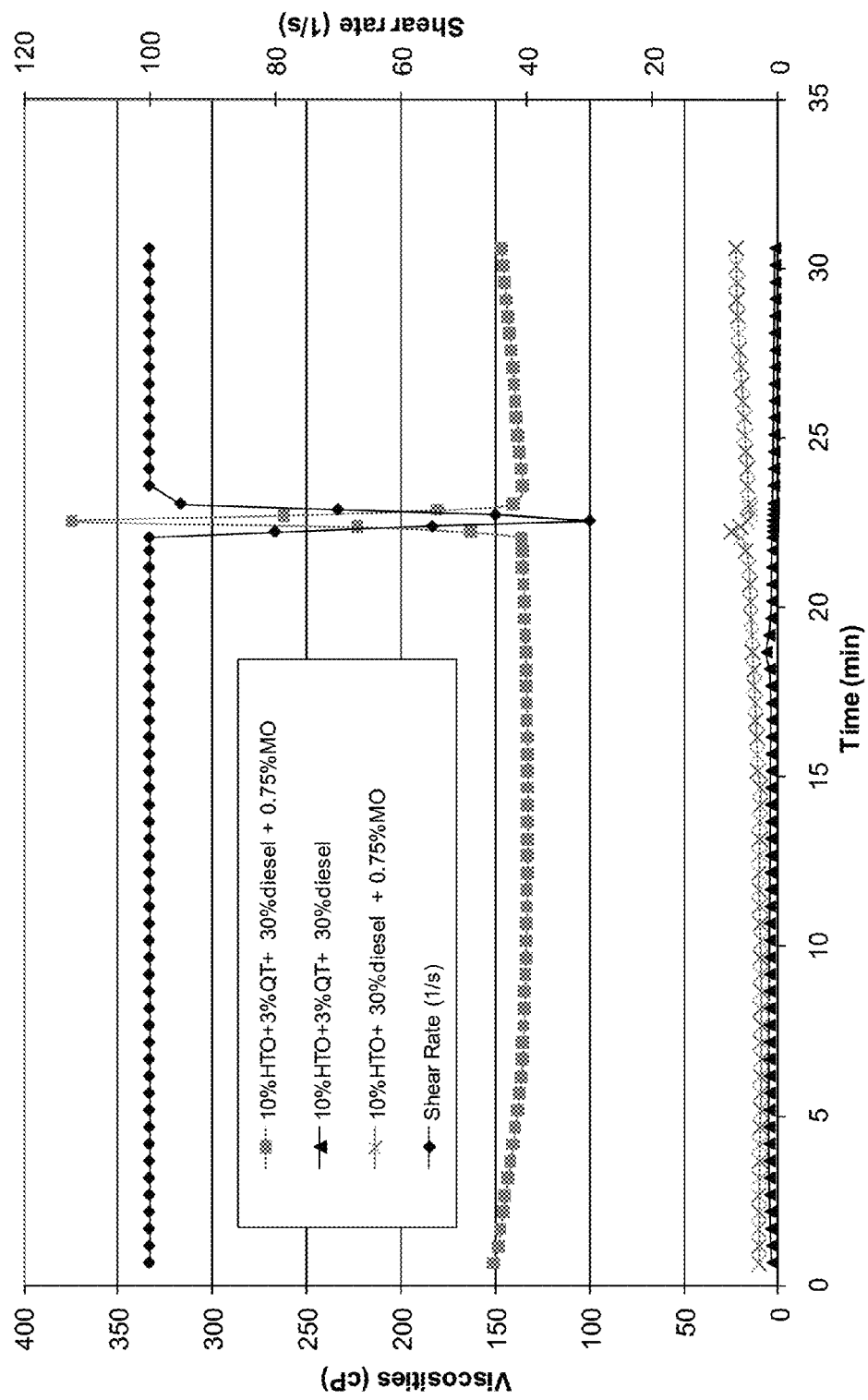

STABILIZING EMULSIFIED ACIDS FOR CARBONATE ACIDIZING

CROSS-REFERENCE TO RELATED APPLICATION

This application is a divisional application of U.S. patent application Ser. No. 12/903,802 filed Oct. 13, 2010, issued Mar. 26, 2013 as U.S. Pat. No. 8,403,051, incorporated herein by reference in its entirety.

TECHNICAL FIELD

The present invention relates to acidizing treatment fluids used during hydrocarbon recovery operations, and more particularly relates, in one embodiment, to emulsified acid compositions and methods of using them to treat a subterranean formation, where the emulsified acid composition has improved thermal stability.

BACKGROUND

Hydrocarbons sometimes exist in a formation but cannot flow readily into the well because the formation has very low permeability. Acidizing wells is a conventional process for increasing or restoring the permeability of subterranean formations so as to facilitate the flow of oil and gas from the formation into the well. This process involves treating the formation with an acid to dissolve fines and carbonate scale that are plugging or clogging the pores, thereby opening the pores and other flow channels and increasing the permeability of the formation. Continued pumping forces the acid into the formation, where it etches channels or wormholes. These channels provide ways for the formation hydrocarbons to enter the well bore.

Conventional acidizing fluids, such as hydrochloric acid or a mixture of hydrofluoric and hydrochloric acids, have high acid strength and quick reaction with fines and scale nearest the well bore, and have a tendency to corrode tubing, casing and downhole equipment, such as gravel pack screens and downhole pumps, especially at elevated temperatures. In addition, above 200° F. (92° C.), HCl is not recommended in some cases because of its destructive effect on the rock matrix. Due to the type of metallurgy, long acid contact times and high acid sensitivity of the formations, removal of the scale with hydrochloric acid and hydrochloric acid mixtures has been largely unsuccessful. However, there are other acid fluid systems to dissolve carbonate and/or scale and remove the source of the fines through acidizing the surrounding formation while not damaging the downhole equipment, particularly for high temperature wells. These acid systems include, but are not necessarily limited to mixtures of tricarboxylic acids, aminocarboxylic acids, dicarboxylic acids including, but not necessarily limited to, oxalic acid (ethanedioic acid), malonic acid (propanedioic acid), succinic acid (butanedioic acid), glutaric acid (pentanedioic acid), adipic acid (hexanedioic acid), pimelic acid (heptanedioic acid), and mixtures thereof. Further details about these acids may be had with reference to U.S. Pat. No. 6,805,198 assigned to Baker Hughes Incorporated, and it is incorporated herein by reference.

Other acids used to treat subterranean formations include, but are not necessarily limited to sulfuric acid, phosphoric acid, hydrofluoric acid, hydrobromic acid, fluoroboric acid, formic acid, acetic acid, glycolic acid, and mixtures of these and the forementioned acids.

It is also known to use emulsified fluids containing such acids to treat subterranean formations. Emulsified acids give reduced or retarded acid reaction rates because of the oil-external outer phase. Some of these acids mentioned above have reduced acid reaction rates with carbonate reservoirs that in turn allows deeper and narrower wormholes to form that may include secondary microfractures. The longer wormholes and/or secondary microfractures are needed in order to improve hydrocarbon production rates. However, a difficulty with some emulsified acids is that they are not thermally stable, that is the viscosity changes markedly over time at elevated temperature.

It would be desirable if a composition and method could be devised to overcome some of the problems in the conventional acidizing methods and fluids, particularly with respect to thermal stability.

SUMMARY

There is thus provided in one non-limiting embodiment a method for acidizing a subterranean carbonate-containing formation, where the method includes injecting a stabilized emulsified acid into the subterranean carbonate-containing formation. The stabilized emulsified acid includes at least one oil, an aqueous acid solution containing at least one acid, at least one emulsifier, and acid insoluble nanoparticles, having an average particle size of 1000 nanometers or less. The amount of nanoparticles is effective to improve the thermal stability of the stabilized emulsified acid as contrasted with an identical emulsified acid absent the nanoparticles. The method further includes dissolving at least a portion of the carbonate in the formation with the acid.

Further there is also provided in another non-restrictive form a stabilized emulsified acid per se that includes at least one oil, an aqueous acid solution having at least one acid, at least one emulsifier, and acid insoluble nanoparticles having an average particle size of 1000 nanometers or less. Again, the amount of nanoparticles is that effective to improve the thermal stability of the stabilized emulsified acid as contrasted with an identical emulsified acid absent the nanoparticles.

BRIEF DESCRIPTION OF THE DRAWINGS

FIG. 2 is a graph of the viscosities of three emulsified acids at 150° F. (66° C.) and 100 1/s as a function of time, where the black curve (diamonds) shows the shear rate, the black curve (triangles) shows the viscosity of an emulsified acid without clay nanoparticles including 3% AQUET® 942 acid emulsifier, the gray curve (squares) shows the viscosity of an emulsified acid with 0.75% clay nanoparticles including 3% AQUET® 942 acid emulsifier, and the gray curve (Xs) shows the viscosity of an emulsified acid with 0.75% clay nanoparticles but not including 3% AQUET® 942 acid emulsifier.

DETAILED DESCRIPTION

Figure 1:
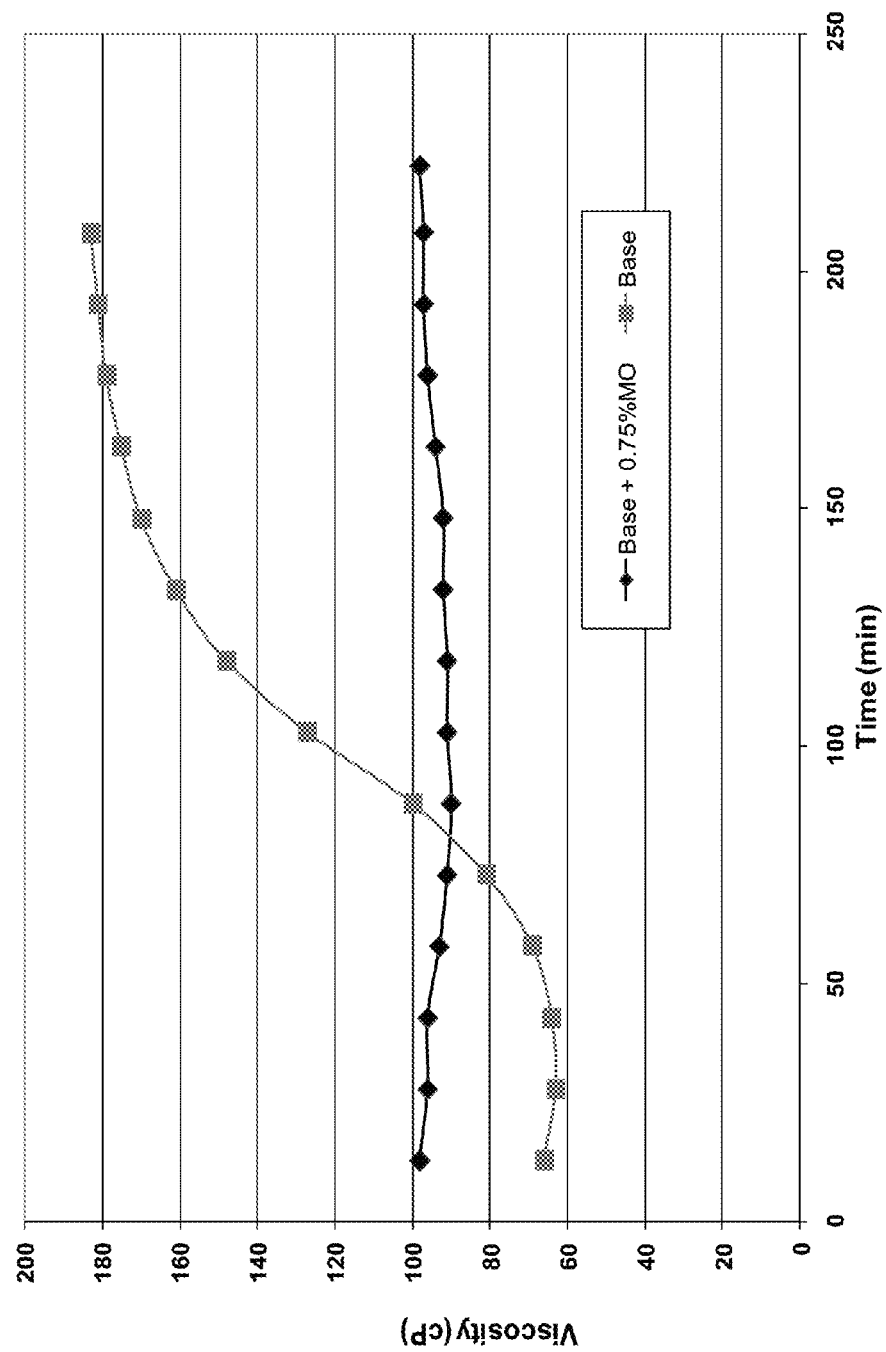
FIG. 1 is a graph of the viscosities of two emulsified acids at 200° F. (93° C.) and 100 1/s as a function of time, where the black curve (diamonds) shows the results from an emulsified acid with nano-sized clay particles and the gray curve (squares) shows the results from an identical emulsified acid but without nano-sized clay particles.

Emulsified acids have been used to increase production rates of oil and gas in carbonate-containing reservoirs through acid fracturing and matrix acidizing operations. The acids emulsified with oil, usually diesel, can reduce corrosion of pumping equipment and downhole tubulars, and decrease the reaction rates with formation carbonates at higher temperatures, which provides active acid to penetrate deeply into the formation. As noted, emulsified acids give reduced or retarded acid reaction rates because of the oil-external outer phase. The stabilization of acid and oil emulsions is usually an issue for field applications. By "stable" it is meant that the viscosity of the emulsified acid is generally maintained, and does not markedly increase or decrease, even over elevated temperatures and the expected pumping shear. A temperature range of interest includes, but is not necessarily limited to, about 100° F. to about 300° F. (about 38° C. to about 149° C.), or alternatively up to about 200° F. (93° C.).

It has been discovered that very small particles, such as colloidal particles and/or nanoparticles increase the temperature stability of emulsified acids. In one non-limiting embodiment, the nanoparticles have an average particle size of about 1000 nanometers (nm) or less, alternatively about 800 nm or less, in another non-restrictive version about 600 nm or less or in another form about 400 nm or less. In one non-limiting embodiment, colloidal particles are defined as having an average particle size of between about 5 independently to about 200 nm. Alternatively, a lower size threshold is about 10 nm. The effective amounts of these nanoparticles in the emulsified acid may range from about 0.1 independently to about 5 wt %, alternatively from about 0.5 independently to about 2 wt %. The term "independently" as used herein with respect to ranges means that any lower threshold may be combined with any upper threshold.

The very small particles should be essentially acid insoluble. By "essentially acid insoluble" is meant less than 1 wt % soluble. Suitable acid insoluble particles are clays, a specific non-limiting example of which is high purity montmorillonite. Other suitable materials may include, but are not limited to, nano-sized quartz, tungsten oxide, graphite, graphene, graphene oxide, nano-carbon tubes, and nano-diamonds. In one non-limiting embodiment, the nanoparticles may have high surface areas compared to their small sizes, but also have relatively high surface charges that permit them to associate or connect other substances together. In one non-limiting embodiment, these associations or connections may help stabilize the emulsified acids and may be due to electrical attractions and other intermolecular forces or effects, but this is a non-limiting theory.

These tiny particles stay with the emulsifier that is positioned between the aqueous acid and the oil to increase the strength of the interface to maintain the stability of the acid emulsion at high temperatures. Thus, the water-in-oil (w/o) emulsion is not as easy to break. As will be discussed further below, laboratory tests with colloidal clay particles show that the stability of emulsified acids such as 20 vol % hydrochloric (HCl) acid at temperatures of 200° F. (92° C.) and 10 vol % HTO™ acid is significantly increased at 0.75 wt % of the colloidal particles. This particle-stabilizing emulsion method may also used to improve fluid loss control, frac-pack and gravel packing fluid systems. HTO™ acid, available from Baker Hughes Incorporated, includes dicarboxylic acids useful in acidizing subterranean formations to improve their permeability, particularly at elevated temperature, e.g. between about 200° F. (92° C.) and about 400° F. (204° C.), as described in U.S. Pat. No. 6,805,198 to Tianping Huang, et al., incorporated herein in its entirety by reference. Particularly suitable dicarboxylic acids described in this patent include, but are not necessarily limited to, succinic acid, glutaric acid, adipic acid, and mixtures thereof.

Some emulsified acid fluid systems have a primary emulsifier and often an optional secondary emulsifier to achieve a thermally stable emulsion with an oil external phase and an acid internal phase. Typically, the acid internal phase may also comprise water, that is, the acid is in aqueous solution. The oil external phase may suitably be xylene, diesel, toluene, kerosene, other aromatics, refined hydrocarbons and mixtures thereof. Other suitable refined hydrocarbons and other aromatic hydrocarbons may include, but are not necessarily limited to, organic fluids such as aliphatic, alicyclic and aromatic hydrocarbons, esters, derivatives of these compounds, as well as mixtures thereof. Specific examples of suitable aliphatic hydrocarbons include, but are not necessarily limited to, alkanes such as n-octane, n-decane, n-tridecane, and higher carbon number alkanes. Other suitable aliphatic hydrocarbons include alkenes and alkadienes. Alicyclic compounds include cyclohexane, and the like. Specific examples of suitable aromatics include, but are not necessarily limited to, benzene, toluene, xylene, ethylbenzene and other alkyl benzenes, naphthalene, and the like. Other examples include nonyl-phenols, ethoxylated nonylphenol, and the like. Particular examples of commercial aromatic products include, but are not necessarily limited to, FRACSOL, FRAC-SOL-S, XYSOL from Trysol of Calgary, Canada or GeoStim of the United States.

Other specific examples of suitable organic fluids for the oil phase include, but are not necessarily limited to, at least one of diesel, gasoline, kerosene, reformate, naphthalene, xylene, toluene, mineral oil, light mineral oil, condensate, crude oil, lubricating oils, or mixtures thereof (such as diesel mixed with condensate to lower API gravity, etc.).

Also suitable are synthetic oils (including, but not necessarily limited to, synthetic hydrocarbon-based oils, ester-type oils, and the like). Also suitable are more environmentally compatible (e.g., biodegradable) natural or synthetic organic fluids such as ExxonMobil's ESCAID 90 or ESCAID 110, or refined kerosene (such as LOTOX available from Exxon), ALPHA OLEFIN (from Baker Performance Chemical), HYDROSOLVE P150 or HYDROSOLVE B100 (from Shrieve Chemical Products), ISOPAR L or ISOPAR M (from Nalco-Exxon Chemical Company), and the like. Natural organic based fluids such as animal oils and vegetable oils may also be suitable including, but not necessarily limited to, linseed oil, palm oil, cotton seed oil, rapeseed oil, soybean oil, olive oil, canola oil, sunflower oil, peanut oil, and the like. Other aromatic and refined hydrocarbons are described in U.S. Pat. No. 6,849,581, incorporated by reference herein in its entirety.

Suitable acids for use herein include, but are not necessarily limited to, hydrochloric acid, sulfuric acid, nitric acid, phosphoric acid, hydrofluoric acid, hydrobromic acid, boric acid, fluoroboric acid, formic acid, acetic acid, glycolic acid, dicarboxylic acids (including, but not necessarily limited to, oxalic acid, malonic acid, succinic acid, glutaric acid, adipic acid, pimelic acid and the like), tricarboxylic acids, aminocarboxylic acids, sulfonic acids, chloracetic acid, hydroxyacetic acid and mixtures thereof. In one non-limiting embodiment the acid concentration in the aqueous phase is usually greater than about 10%. An acid concentration of less than about 5% is not used in other non-limiting versions.

In another non-restrictive version herein, the pH of emulsified acids may range from about 0.01 independently to about 3.0, alternatively from about 0.1 independently to about 1.5. A pH range of between 5 and 7 may be considered too high in most cases.

Similar to other emulsified acid systems, the present fluids have reduced acid reaction rates with carbonate reservoirs that in turn permit deep and narrow wormholes to form that may include secondary microfractures. The longer wormholes and secondary microfractures involve good clean-up in order to improve hydrocarbon production rates.

Suitable emulsifiers include, but are not necessarily limited to, low HLB surfactants or oil soluble surfactants. In one non-limiting embodiment the HLB is about 12 or below; alternatively, the HLB is about 10 or below; and in another non-limiting embodiment is about 8 or below. More specific suitable emulsifiers include, but are not necessarily limited to, polysorbates, alkyl sulfosuccinates, alkyl phenols, ethoxylated alkyl phenols, alkyl benzene sulfonates, fatty acids, ethoxylated fatty acids, propoxylated fatty acids, fatty acid salts, tall oils, castor oils, triglycerides, ethoxylated triglycerides, alkyl glucosides, and mixtures and derivatized fatty acids such as those disclosed in U.S. Pat. No. 6,849,581, incorporated by reference herein in its entirety. Suitable polysorbates include, but are not necessarily limited to, sorbitan monolaurate, sorbitan monopalmitate, sorbitan monostearate, sorbitan monooleate, sorbitan monodecanoate, sorbitan monooctadecanoate, sorbitan trioleate and the like and ethoxylated derivatives thereof. For instance, these emulsifiers may have up to 20 ethoxy groups thereon. Suitable polysorbates include, but are not necessarily limited to, SPAN® 40, SPAN 40, SPAN 60 and SPAN 80 polysorbates available from Croda International PLC. Other suitable emulsifiers include stearyl alcohol, lecithin, fatty acid amines, ethoxylated fatty acid amines and mixtures thereof. In one non-limiting embodiment, more than one emulsifier is used. Matching which emulsifiers work well together to give the desired results may largely be a matter of trial and error.

In one non-limiting embodiment, the stabilized emulsified acids do not contain any viscoelastic surfactant, alternatively less than 0.1 vol %, or in another non-limiting embodiment less than 0.5 vol % viscoelastic surfactant.

In one non-limiting embodiment, the concentration of aqueous acid in the emulsified fluid is greater than 10 wt %. The amount of aqueous acid may be between about 50 independently to about 85 vol %, and alternatively between about 60 independently to about 75 vol %. The amount of hydrocarbon, e.g. diesel in the emulsified acid may range from about 13 independently to about 45 vol %, alternatively from about 20 independently to about 35 vol %. The amount of emulsifier may range from about 1 independently to about 5 vol %, alternatively from about 2 independently to about 4 vol %, all based on the total of the emulsified acid.

The viscosity of the emulsified acid should be stable during pumping through the tubing and during flow into the formation, which is a time frame of about 3 to 4 hours, in one non-limiting embodiment. In one non-restrictive version, the viscosity ranges from about 30 independently to about 200 cP; alternatively from about 50 independently to about 150 cP.

It will be appreciated that it is not necessary for the viscosity of the emulsified acid to be exactly stable at only one viscosity for the compositions and methods described herein to be considered successful. However, the viscosity of the emulsified acid is expected to vary over a much narrower range over time at elevated temperature to be successful, as compared to an otherwise identical emulsified acid having no colloidal or nanosized particles. In one non-limiting embodiment, the viscosity may vary ±15 cP, alternatively ±10 cp and in another non-restrictive version ±5 cP.

In another non-restrictive version, the emulsified acids do not include, or have an absence of a gas, for instance an absence of a gas, such as to adjust, particularly decrease, viscosity; in particular an absence of carbon dioxide, nitrogen, air, flue gas, and combinations thereof.

The emulsified acids may effectively generate wormholes to stimulate production in subterranean carbonate formations and dissolve carbonate and/or scale, and these emulsified acid systems may effectively remove fines to recover production in sandstone formations at elevated temperatures. In one non-limiting aspect, the emulsified acids delay or inhibit the quick reaction of the acid with wellbore and formation carbonate rocks, thus permitting the fluid to have deeper penetration and to permit the acid to be effective for a longer distance.

It will be appreciated that it is difficult to specify with precision the amount of emulsified acid that must be used to effectively acidize a particular subterranean formation. A number of complex, interrelated factors must be taken into account that would affect such a proportion, including but not necessarily limited to, the temperature of the formation, the pressure of the formation, the particular fines and scales present in the formation (e.g. calcium carbonate, silicates, and the like), the particular dicarboxylic acid(s) used, the particular kind of rock in the formation, the expected contact time of the acid composition with the formation, etc.

For stimulation treatments, contact times are determined from the maximum pumping rate that does not cause the downhole pressure to exceed the fracturing pressure. This type of treatment is called a "matrix" acid job.

For scale/fines removal procedures, contact times are based on laboratory tests, but usually range from about 0.5 hour to about 2 hour with the most common time being about 0.5 hour.

The invention will be further illustrated with respect to certain experiments, but these examples are not intended to limit the invention, but only to further describe it in certain specific, non-limiting embodiments.

EXAMPLE 1

Shown in FIG. 1 is a graph of the viscosities of two emulsified acids at 200° F. (93° C.) and 100 1/s as a function of time. The base fluid is a 20% HCl acid having 1% corrosion inhibitor (CI-300 corrosion inhibitor, a product of Baker Hughes Incorporated), 1% iron control agent (ethylenediaminetetraacetic acid, EDTA) and 2.5% AQUET® 942 emulsifier (also available from Baker Hughes Incorporated) and 30% diesel oil. The gray curve (squares) shows the results of the emulsified acid without nano-sized clay particles, and it may be seen that the viscosity changes markedly over time at this temperature. In contrast, when 0.75% MO clay product (a mineral colloid where the clay particles have an average particle size of less than 1000 nm, available from Southern Clay Products, inc.) was added, the data in the black curve (diamonds) resulted, showing that the viscosity was much more stable and consistent over time at this temperature; between about 90-100 cP.

EXAMPLE 2

FIG. 2 presents the viscosities of emulsified acids at 150° F. (66° C.) and 100 1/s as a function of time. The black curve (diamonds) shows the shear rate. An emulsified acid made with 30% diesel, 10% aqueous HTO acid and 3% QT (AQUET® 942 emulsifier), but no nanoparticles gave the black curve with triangles at the bottom of the graph, and was essentially non-viscous. A formulation with 10% HTO, 30% diesel and 0.75% MO colloidal clay, but no emulsifier, gave the gray curve (Xs), but this fluid also had very low viscosity. However, the emulsified acid having 30% diesel, 10% aqueous HTO acid, 0.75% MO colloidal clay and 3% QT (AQUET® 942 emulsifier) gave the gray curve (squares)

demonstrating a stable viscosity at around 150 cP at this temperature, further demonstrating the effectiveness of the compositions described herein.

In the foregoing specification, the invention has been described with reference to specific embodiments thereof, and has been demonstrated as effective in providing emulsified acid systems that have improved stability. However, it will be evident that various modifications and changes can be made thereto without departing from the broader spirit or scope of the invention as set forth in the appended claims. Accordingly, the specification is to be regarded in an illustrative rather than a restrictive sense. For example, specific combinations of acids, hydrocarbon phases, emulsifiers, colloidal and nanosized particles and other components falling within the claimed parameters, but not specifically identified or tried in a particular composition or under specific conditions, are anticipated to be within the scope of this invention.

The present invention may suitably comprise, consist or consist essentially of the elements disclosed and may be practiced in the absence of an element not disclosed. For example the stabilized emulsified acid may consist essentially of or consist of at least one oil, an aqueous acid solution having at least one acid, at least one emulsifier, and an amount of acid insoluble nanoparticles as defined by the claims.

The words "comprising" and "comprises" as used throughout the claims is to interpreted "including but not limited to".

What is claimed is:

1. A stabilized emulsified acid comprising:
   from about 13 to about 45 vol % of at least one oil;
   from about 50 to about 85 vol % of an aqueous acid solution comprising at least one acid;
   from about 1 to about 5 vol % of at least one emulsifier; and
   from about 0.1 to about 5 wt % of acid insoluble nanoparticles, having an average particle size of about 1000 nanometers or less, where the acid insoluble nanoparticles are selected from the group consisting of clays, quartz, tungsten oxide, graphite, graphene, graphene oxide, nano-carbon tubes, and nano-diamonds and combinations thereof.

2. The stabilized emulsified acid of claim 1 where the amount of acid insoluble nanoparticles is effective to improve the thermal stability of the stabilized emulsified acid as contrasted with an identical emulsified acid absent the nanoparticles.

3. The stabilized emulsified acid of claim 1 where the at least one oil is selected from the group consisting of xylene, diesel, toluene, kerosene, other aromatics, refined hydrocarbons and mixtures thereof.

4. The stabilized emulsified acid of claim 1 where the at least one acid is selected from the group consisting of hydrochloric acid, sulfuric acid, nitric acid, phosphoric acid, hydrofluoric acid, hydrobromic acid, boric acid, fluoroboric acid, formic acid, acetic acid, glycolic acid, dicarboxylic acid, tricarboxylic acids, aminocarboxylic acids, sulfonic acids, chloracetic acid, hydroxyacetic acid and mixtures thereof.

5. The stabilized emulsified acid of claim 1 where the at least one emulsifier is selected from the group consisting of polysorbates, alkyl sulfosuccinates, alkyl phenols, ethoxylated alkyl phenols, alkyl benzene sulfonates, ethoxylated fatty acid amines, fatty acid amines, stearyl alcohol, lecithin, fatty acids, ethoxylated fatty acids, propoxylated fatty acids, fatty acid salts, tall oils, castor oils, triglycerides, ethoxylated triglycerides, alkyl glucosides, and mixtures and derivatives thereof.

6. The stabilized emulsified acid of claim 1 where the acid concentration in the aqueous acid solution is 10 vol % or greater, based on the aqueous acid solution.

7. The stabilized emulsified acid of claim 1 where the emulsified acid has a viscosity in the range of from about 30 to about 200 cP.

8. A stabilized emulsified acid comprising:
   from about 13 to about 45 vol % of at least one oil;
   from about 50 to about 85 vol % of an aqueous acid solution comprising at least one acid in a concentration of the aqueous acid solution of at least 10 vol %;
   from about 1 to about 5 vol % of at least one emulsifier; and
   from about 0.1 to about 5 wt % of acid insoluble nanoparticles, having an average particle size of about 1000 nanometers or less, where the acid insoluble nanoparticles are selected from the group consisting of clays, quartz, tungsten oxide, graphite, graphene, graphene oxide, nano-carbon tubes, and nano-diamonds and combinations thereof, in an amount effective to improve the thermal stability of the stabilized emulsified acid as contrasted with an identical stabilized emulsified acid absent the nanoparticles,
   where the emulsified acid has a viscosity in the range of from about 30 to about 200 cP.

9. The stabilized emulsified acid of claim 8 where the at least one oil is selected from the group consisting of xylene, diesel, toluene, kerosene, other aromatics, refined hydrocarbons and mixtures thereof.

10. The stabilized emulsified acid of claim 8 where the at least one acid is selected from the group consisting of hydrochloric acid, sulfuric acid, nitric acid, phosphoric acid, hydrofluoric acid, hydrobromic acid, boric acid, fluoroboric acid, formic acid, acetic acid, glycolic acid, dicarboxylic acid, tricarboxylic acids, aminocarboxylic acids, sulfonic acids, chloracetic acid, hydroxyacetic acid and mixtures thereof.

11. The stabilized emulsified acid of claim 8 where the at least one emulsifier is selected from the group consisting of polysorbates, alkyl sulfosuccinates, alkyl phenols, ethoxylated alkyl phenols, alkyl benzene sulfonates, ethoxylated fatty acid amines, fatty acid amines, stearyl alcohol, lecithin, fatty acids, ethoxylated fatty acids, propoxylated fatty acids, fatty acid salts, tall oils, castor oils, triglycerides, ethoxylated triglycerides, alkyl glucosides, and mixtures and derivatives thereof.

12. A stabilized emulsified acid comprising:
   from about 13 to about 45 vol % of at least one oil selected from the group consisting of xylene, diesel, toluene, kerosene, other aromatics, refined hydrocarbons and mixtures thereof;
   from about 50 to about 85 vol % of an aqueous acid solution comprising at least one acid in a concentration of the aqueous acid solution of at least 10 vol %, where the at least one acid is selected from the group consisting of hydrochloric acid, sulfuric acid, nitric acid, phosphoric acid, hydrofluoric acid, hydrobromic acid, boric acid, fluoroboric acid, formic acid, acetic acid, glycolic acid, dicarboxylic acid, tricarboxylic acids, aminocarboxylic acids, sulfonic acids, chloracetic acid, hydroxyacetic acid and mixtures thereof;
   from about 1 to about 5 vol % of at least one emulsifier; and
   from about 0.1 to about 5 wt % of acid insoluble nanoparticles, having an average particle size of about 1000 nanometers or less, where the acid insoluble nanoparticles are selected from the group consisting of clays, quartz, tungsten oxide, graphite, graphene, graphene oxide, nano-carbon tubes, and nano-diamonds and combinations thereof, in an amount effective to improve the thermal stability of the stabilized emulsified acid as contrasted with an identical stabilized emulsified acid absent the nanoparticles, where the emulsified acid has a viscosity in the range of from about 30 to about 200 cP.

13. The stabilized emulsified acid of claim 12 where the at least one emulsifier is selected from the group consisting of polysorbates, alkyl sulfosuccinates, alkyl phenols, ethoxylated alkyl phenols, alkyl benzene sulfonates, ethoxylated fatty acid amines, fatty acid amines, stearyl alcohol, lecithin, fatty acids, ethoxylated fatty acids, propoxylated fatty acids, fatty acid salts, tall oils, castor oils, triglycerides, ethoxylated triglycerides, alkyl glucosides, and mixtures and derivatives thereof.

* * * * *